June 5, 1956 W. G. PARR 2,749,437

TRIGGER CIRCUIT

Filed March 17, 1952 2 Sheets-Sheet 1

Inventor

William Geoffrey Parr

By O'Brien & Blair

Attorneys

June 5, 1956 W. G. PARR 2,749,437

TRIGGER CIRCUIT

Filed March 17, 1952 2 Sheets-Sheet 2

Inventor
William Geoffrey Parr

By O'Brien & Blair
Attorneys

United States Patent Office 2,749,437

Patented June 5, 1956

2,749,437

TRIGGER CIRCUIT

William G. Parr, Cambridge, England, assignor to Pye Limited, St. Andrews, England, a British company Application March 17, 1952, Serial No. 276,983

Claims priority, application Great Britain January 7, 1952

13 Claims. (Cl. 250—27)

The present invention relates to trigger-pair and like circuits which have a number of stable states, and more particularly to an arrangement for resetting the circuit to a predetermined state. Trigger-pair circuits comprise two valves which may be set to either of two stable states, as in bi-stable multivibrators, but similar trigger circuits incorporating three or more valves, apart from any driving buffer valves, are known which have a correspondingly greater number of stable states, and the expression "trigger-pair and like circuits" when used herein and in the claims is intended to include all such trigger circuits having a plurality of stable states.

Such circuits may be used in electronic counting devices or for electronic switching.

Trigger-pair and like circuits either as individual units or when a number of units are interconnected to form a composite assembly, will display, when a train of suitable pulses is applied to an input terminal thereof, a definite sequence of stable states, and an output connection can be made to provide an output pulse during the transition from one particular state to the next. An output pulse can be produced after any chosen number of input pulses less than the total number of distinct states if the assembly is reset to a predetermined state before the pulse train starts. If this resetting is initiated by the output pulse, output pulses will be obtained after every group of input pulses containing the chosen number of input pulses. For example, in counting circuits which may comprise a plurality of series-connected binary counters each comprising a pair of valves connected as a trigger-pair circuit (bi-stable multivibrator), the desired count (other than when a binary number is to be counted) is controlled by resetting the binary counters of one or more of the preceding stages by feeding back output pulses from later stages of the circuit.

In another example, in a simple switching circuit comprising, for example, a single trigger-pair circuit, it is sometimes desirable to reset the circuit to one of its stable states so that the next input pulse will again effect the triggering of the circuit to its second stable state.

Resetting can be achieved by applying resetting pulses to the control grids of the appropriate valves of the assembly. The pulse can either be applied directly to the grids via circuits introduced for this purpose, or indirectly via the normal cross-coupling networks of the trigger circuits by producing pulses at the appropriate anodes or at the bases of the appropriate grid leaks. If it is necessary to reset several component trigger circuits, the resetting circuits must be so designed that no possible combination of changes of state of the individual trigger circuits can produce unwanted changes in the others.

The present invention has for its object to provide a feedback or resetting arrangement which introduces a negligible asymmetry when it is connected to a well-designed trigger circuit, which reduces to a negligible value interaction between different trigger circuits included in the same assembly, which enables a single buffer valve to be used for feeding a resetting pulse to a number of trigger circuits, and which also enables a large resetting pulse to be applied without the need for a large input current.

The invention consists in an arrangement for resetting trigger-pair and like circuits to a predetermined stable state, wherein a negative resetting pulse is applied to the end or ends of one or more grid leaks which is/are normally returned to earth, said end or ends being connected to earth through a rectifier which provides a low impedance path to earth for the current flowing through the associated grid leak and which presents a high impedance to earth to the applied negative resetting pulse.

The invention also consists in an arrangement for simultaneously resetting a plurality of trigger-pair and like circuits to a predetermined state, wherein those ends of the grid leaks, of the appropriate valves of the trigger circuits which are to be reset, which are normally returned to earth are connected to a resetting line which in turn is connected to earth through a rectifier, and wherein a negative pulse is applied to the resetting line to effect resetting of the trigger circuits of which the grid leaks are connected thereto, said rectifier providing a low impedance path to earth for the currents flowing through those cross-coupling networks connected to the resetting line and presenting a high impedance to earth for the applied negative resetting pulse. The negative resetting pulse can be applied to the resetting line via a condenser.

The provision of the rectifier ensures that the potential difference between the resetting line and earth is small so that the symmetry of a well designed trigger circuit is not appreciably affected by the transfer of the "earth" end of a grid leak from the earth lead to the resetting line. The small change of the potential of the resetting line, produced when one trigger circuit changes state, does not appreciably affect the other trigger circuits. When the negative resetting pulse is applied, the rectifier presents a high back impedance to the line, and a large pulse amplitude can be developed without the need for a high input current.

In order that the invention may be more clearly understood, reference will now be made to the accompanying drawings, in which.

Figure 1:
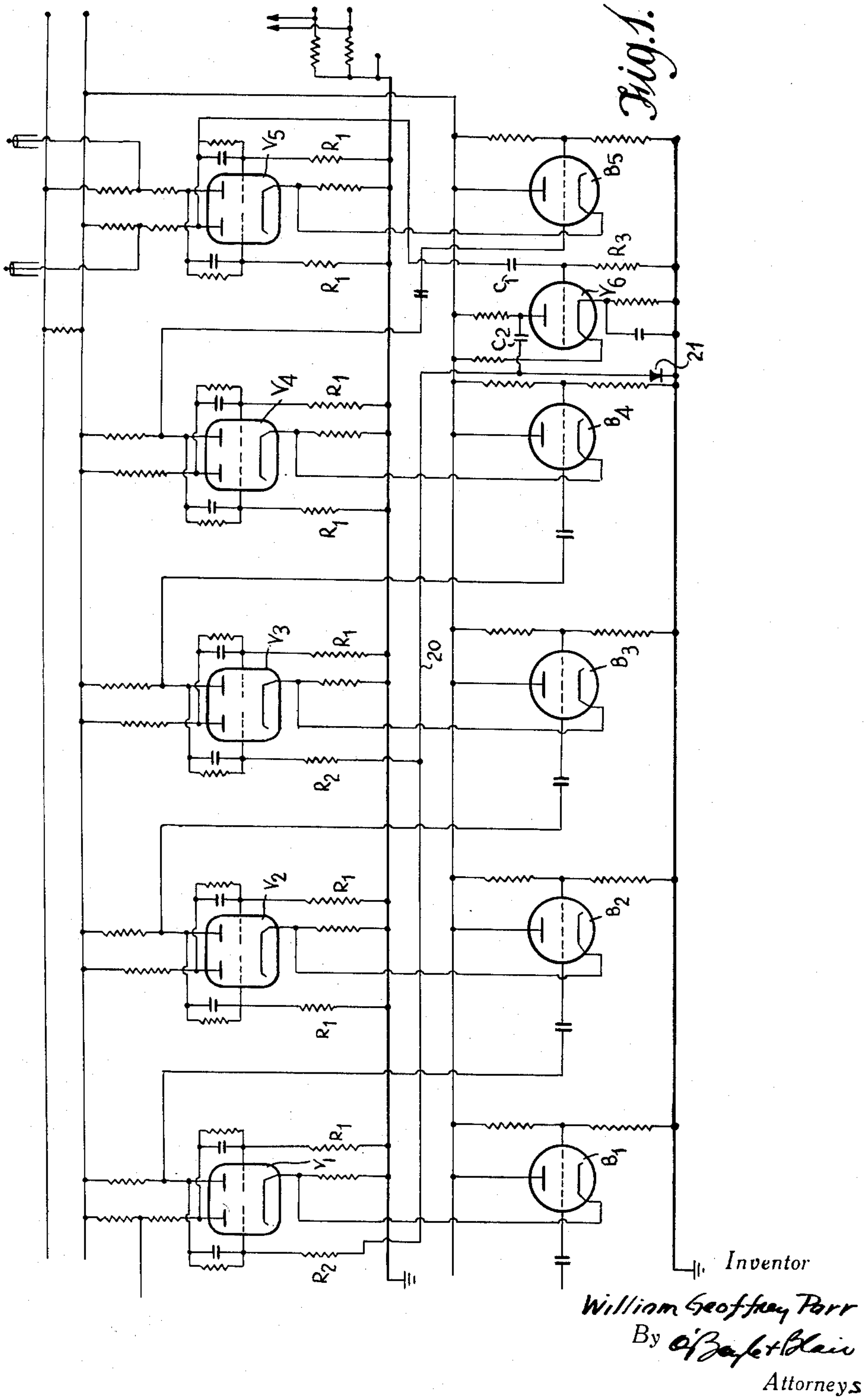
Fig. 1 shows a circuit diagram of a divider circuit.

Fig. 1 shows a circuit diagram of a divider for producing an output pulse after successive groups containing a predetermined number of input pulses, which can be used as part of a divider circuit for deriving, for example the frame synchronising repetition frequency from the master pulse frequency in a television waveform generator, as described in the specification of co-pending application Serial No. 113,126 filed August 30, 1949, Patent No. 2,705,285, issued March 29, 1955. The circuit shown is for dividing by 27, and can be connected in series with a similar divider which divides by 15 when a total division of 405 is required for the British television waveform. By suitable selection of the binary counters to which the resetting voltage is fed, the circuit can be modified to produce other counts.

The division is accomplished by five bi-stable multivibrators $V_1$, $V_2$, $V_3$, $V_4$ and $V_5$, each comprising two triodes within a common envelope and with a common cathode, the anodes and grids being cross-connected in known manner with resistances and capacities so that each multivibrator will be alternately switched to conduct in its right-hand or left-hand triode as positive triggering pulses are applied to the common cathodes via the cathodes of buffer valves $B_1$, $B_2$, $B_3$, $B_4$ and $B_5$ respectively, to the control grids of which the triggering pulses from a preceding stage are fed. These buffer valves B are biased off between triggering pulses.

The control grids of the right-hand triodes of each multivibrator are connected to earth through resistors $R_1$, as are also those control grids of the left-hand triodes of each multivibrator to which a resetting voltage does not have to be applied. The control grids of the left-hand triodes of the first and third multivibrators which have to be reset in order to produce the desired count of 27, are connected through resistances $R_2$ of the same value as the resistances $R_1$ to a resetting line 20. This resetting line is connected to earth through a rectifier 21 which provides a low impedance path to earth for the currents flowing from the grids connected to the resetting line so that a negligible degree of binary counter asymmetry is introduced. The rectifier, when conducting, presents a low impedance so that the change of line potential produced when one counter changes state is negligible and does not affect the others (only one other is shown in the specific embodiment illustrated) connected to the resetting line.

Resetting feedback is accomplished by means of a triode buffer valve $V_6$. The waveform appearing at the appropriate anode of the binary from which feedback is to be obtained, namely, the anode of the left-hand triode of binary $V_5$ in the embodiment shown, is differentiated in the differentiating circuit $C_1$, $R_3$ and applied to the grid of the triode $V_6$ which is normally biased below cut-off, the positive spike of the differentiated pulse only being able to open the valve. The corresponding negative pulse appearing at the anode of triode $V_6$ is applied to the feedback line 20 through the condenser $C_2$ to reset the selected binary counters to the predetermined state. The rectifier 21 presents a high impedance to the negative feedback pulses, thus enabling a large negative resetting pulse to be obtained without the need for a large input current.

The rectifier 21 may be a diode or a crystal rectifier, and the arrangement according to the invention has the economical advantage that the resetting pulse required to reset several binary counters can be produced by a single valve.

Of course, if resetting pulses are required from the outputs of different binary counters, then separate resetting buffer valves and resetting lines would, of course, be provided.

Since the rectifier has a low forward impedance, the potential difference between the resetting line and earth is small and the symmetry of a well-designed trigger circuit is not appreciably affected by the transfer of one of its grid leaks from the earth line to the resetting line or vice versa. As the resetting pulse need not possess sharp edges and is applied to points which are not required to change potential during trigger circuit changeovers, elaborate switching circuits in which the leads connected to the resetting line have a high capacity to earth can be incorporated to alter the state to which the circuit is reset.

Figures 2, 3:
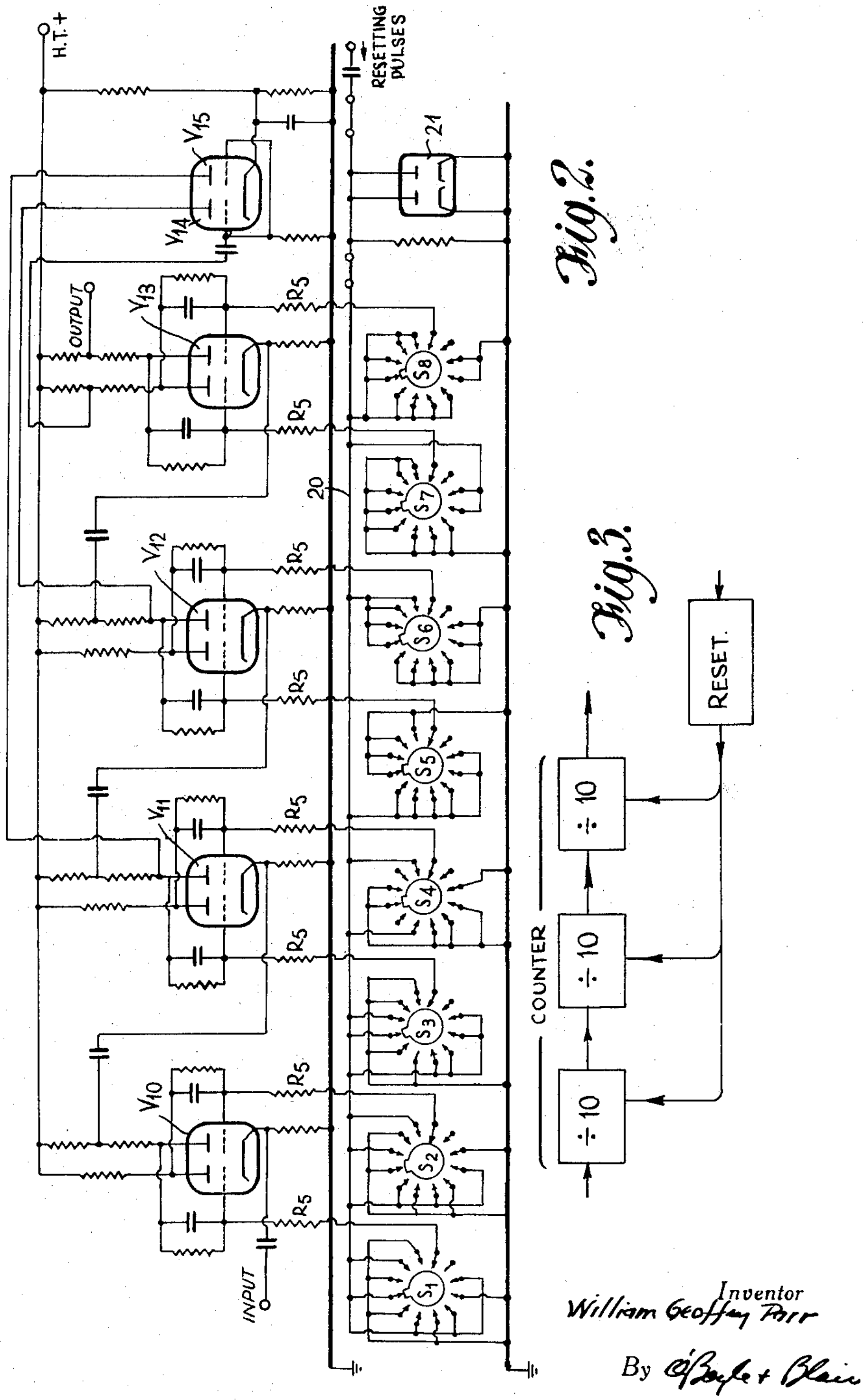
Fig. 2 shows a circuit diagram of a scale of ten counter.
Fig. 3 is a block diagram of three series connected scale of ten counters.

One circuit arrangement incorporating such switching means is shown in Figure 2, which shows a circuit arrangement for a scale of ten counter which can be manually adjusted to provide a first output pulse after any desired number of input pulses between 1 and 10 and thereafter after every succeeding group of ten input pulses. The scale of ten counter comprises four binary counters, each comprising a bi-stable multivibrator $V_{10}$, $V_{11}$, $V_{12}$ and $V_{13}$, series-connected in known manner so that each binary counter in the circuit will be triggered by the output pulses from the immediately preceding binary counter. With four binary counters, an output pulse from the fourth counter would normally occur after every 16 input pulses, and feedback is applied to the second and third counters from the output from the fourth counter so as to produce an output pulse from the fourth counter after every 10 input pulses. This resetting is effected through the buffer valves $V_{14}$, $V_{15}$ to the anodes of the right-hand triodes of valves $V_{11}$, $V_{12}$. The circuit so far described is conventional.

In order to produce the first output pulse from the counter after any selected number of input pulses from 1 to 10, eight rotary selector switches are provided which are coupled together for common operation and are arranged to apply resetting pulses to the appropriate triode of each of the four multivibrators to establish a start condition in the counter so that the first output pulse will be obtained after a predetermined number of input pulses selected by the position of the switch. Thus, if an output pulse is required after 6 input pulses, the multivibrators are adjusted to the state which they would normally assume after 4 input pulses have followed an output pulse, so that after 6 input pulses the counter will produce an output pulse. Further output pulses will be produced after each succeeding group of 10 input pulses.

The setting of the multivibrators to a predetermined condition, is effected by applying negative resetting pulses to one or more of the ends of the grid resistors $R_5$ remote from the grids. Each grid resistor $R_5$ is connected respectively to the rotary contact $S_1$, $S_2$, $S_3$ . . . $S_8$ of the eight rotary switches which, in their different positions, selectively connect the resistors $R_5$ either to a resetting line 20 or the earth line E. Resetting pulses are fed to the resetting line 20 between which and the earth line E are connected one or more rectifiers 21 which present a low impedance path to earth for the currents flowing through the grid leaks which are connected to the resetting line, whilst presenting a high impedance to earth to the negative resetting pulses applied to the resetting line. The resetting pulses may be derived from the output pulse of the counter, or from a plurality of cascade connected scale-of-ten counters, so that after effecting the selected count, the circuit will be reset for again counting the same number.

By connecting three decimal counters as illustrated in Figure 2 in cascade, a counting device which makes possible any count up to 1,000 is obtained. Such a counter, which is represented by the block diagram of Fig. 3, passes in turn through each of one thousand distinct states when pulses are applied to the input, the transition from the state 999 to the state 0 producing an output pulse. If the counter is set to the appropriate state before the count starts, an output pulse will occur after any chosen number of input pulses from 1 to 1,000. Each of the three component decimal counters passes in turn through its 10 stable states as pulses are applied to its input, each transition from the state 9 to the state 0 producing an input pulse for the following counter. The last input pulse of the desired count must produce the output pulse from the first counter which leads to the production of output pulses from the second and third counters. For example, if an output pulse is desired after 365 input pulses, the first counter must be set to give its first output pulse after 5 input pulses. The 37th output pulse will thus be produced by the 365th input pulse. The second counter is set to give its first output pulse after 7 input pulses and the 3rd to give an output pulse after the 4th input pulse which is produced by the 365th pulse applied to the complete counter.

The setting of the state of the three decimal counters for any desired count is effected by means of three 8-bank rotary switches, as described with reference to Figure 2, calibrated respectively in hundreds, tens and units, the setting of which controls the redistribution to the appropriate grids of the binary counters of a large resetting pulse generated by a single valve.

Whilst particular embodiments have been described, it will be understood that various modifications may be made without departing from the scope of the invention. Thus, provided sufficiently large resetting pulses are available, each grid can be returned via several grid leaks to several independent resetting lines. A pulse of one line appears so greatly attenuated across the low impedance presented by another that it has no effect on the trigger circuits under its control. Alternatively, the end of a grid leak remote from the grid can be connected via rectifier elements, arranged to present a low impedance to the current flowing through the grid leak, to several resetting lines, each connected via a rectifier to earth. The resetting pulse on one line will appear greatly attenuated on the others.

I claim:

1. Apparatus comprising a plurality of electronic valves interconnected as a trigger circuit having a plurality of stable states, each valve having an anode, a cathode and a control electrode, a first resistor connected between the control electrode of one of the valves and a point of earth potential, a rectifier having one electrode connected to said point of earth potential, a second resistor connected between the control electrode of another of the valves and the other electrode of said rectifier, an output circuit connected to the anode of at least one valve, an input circuit connected to the cathodes of at least another of the valves, and means for applying pulses at the junction of said second resistor and said rectifier.

2. Apparatus comprising a pair of electronic valves connected as a trigger pair circuit having two stable states, each of said valves having an anode, a cathode, and a control electrode, a first resistor connected between the control electrode of one valve and a point of earth potential, a rectifier having one electrode connected to said point of earth potential, a second resistor connected between the control electrode of the other valve and the other electrode of said rectifier, an output circuit connected to the anode of at least one valve, an input circuit connected to the cathodes of the valves, a condenser connected to the junction of said second resistor and said rectifier and means for applying pulses to said condenser.

3. A circuit arrangement for resetting to a predetermined state a plurality of trigger circuits, wherein each trigger circuit consists of a number of electronic valves, comprising a resetting line, means for applying resetting pulses to said resetting line, a rectifier, a point of earth potential, means for connecting the rectifier between said resetting line and said point of earth potential such that said rectifier presents a high impedance to earth for the resetting pulses applied to said resetting line, a plurality of resistors, one end of each resistor being respectively connected to the control electrode of one of the electronic valves, means connecting the other ends of those resistors to which it is desired that resetting pulses should be applied to said resetting line, and means connecting the other ends of the remaining resistors to the point of earth potential.

4. A circuit arrangement for resetting to a predetermined state a plurality of trigger pair circuits, wherein each trigger pair circuit comprises a pair of cross-connected electronic valves, each having an anode, a cathode and a control electrode, comprising a resetting line, means for applying resetting pulses to said resetting line, a rectifier, a point of earth potential, means for connecting the rectifier between said resetting line and said point of earth potential such that said rectifier presents a high impedance to earth for the resetting pulses applied to said resetting line, a plurality of resistors, one end of each resistor being respectively connected to the control electrode of one of the electronic valves, means connecting the other ends of those resistors to which it is desired that resetting pulses should be applied to said resetting line, and means connecting the other ends of the remaining resistors to the point of earth potential.

5. A circuit arrangement for resetting to a predetermined state a plurality of trigger pair circuits, wherein each trigger pair circuit comprises a pair of cross-connected electronic valves, each having an anode, a cathode and a control electrode, comprising a resetting line, a condenser having one plate connected to said resetting line, means for applying resetting pulses to the other plate of said condenser, a rectifier, a point of earth potential, means for connecting the rectifier between said resetting line and said point of earth potential, such that said rectifier presents a high impedance to earth for the resetting pulses applied to said resetting line, a plurality of resistors, one end of each resistor being respectively connected to the control electrode of one of the electronic valves, means connecting the other ends of those resistors to which it is desired that resetting pulses should be applied to said resetting line, and means connecting the other ends of the remaining resistors to the point of earth potential.

6. A divider circuit comprising a plurality of trigger-pair circuits each consisting of a plurality of interconnected electronic valves, wherein means are provided for resetting said divdier to a predetermined state, said means comprising a resetting line, means for feeding an output pulse from one of said trigger-pair circuits to said resetting line, a rectifier connected between said resetting line and a point of earth potential with such polarity that said rectifier presents a high impedance to earth for the resetting pulses applied to said resetting line, a plurality of resistors, one end of each resistor being respectively connected to the control electrode of one of the electronic valves, means connecting the other ends of those resistors to which it is desired that resetting pulses should be applied to said resetting line, and means connecting the other ends of the remaining resistors to the point of earth potential.

7. A divider circuit comprising a plurality of trigger-pair circuits each consisting of a pair of cross-connected electronic valves, each having an anode, a cathode and a control electrode, wherein means are provided for resetting said divider to a predetermined state, said means comprising a resetting line, means for connecting an output electrode of one of said pairs of cross-connected valves to said resetting line, a rectifier connected between said resetting line and a point of earth potential with such polarity that said rectifier presents a high impedance to earth for the resetting pulses applied to said resetting line, a plurality of resistors equal to the number of electronic valves, one end of each resistor being respectively connected to the control electrode of one of the electronic valves, means connecting the other ends of those resistors to which it is desired that resetting pulses should be applied to said resetting line, and means connecting the other ends of the remaining resistors to the point of earth potential.

8. A divider circuit comprising a plurality of trigger-pair circuits each consisting of a pair of cross-connected electronic valves, each having an anode, a cathode and a control electrode, wherein means are provided for resetting said divider to a predetermined state, said means comprising a resetting line, a buffer valve having input and output electrodes, means for connecting the input electrode of said buffer valve to an output electrode of one of said pairs of cross-connected electronic valves, from which said resetting pulses are derived, means for connecting the output electrode of said buffer valve to said resetting line, a rectifier connected between said resetting line and a point of earth potential with such polarity that said rectifier presents a high impedance to earth for the resetting pulses applied to said resetting line through said buffer valve, a plurality of resistors equal to the number of electronic valves, one end of each resistor being respectively connected to the control electrode of one of the electronic valves, means connecting the other ends of those resistors to which it is desired that resetting pulses should be applied to said resetting line, and means connecting the other ends of the remaining resistors to the point of earth potential.

9. A divider circuit comprising a plurality of trigger-pair circuits each consisting of a pair of cross-connected electronic valves, each having an anode, a cathode and a control electrode, wherein means are provided for resetting said divider to a predetermined state, said means comprising a resetting line, a buffer valve having input and output electrodes, a condenser connected between the input electrode of said buffer valve and an output of one of said pairs of cross-connected electronic valves, from which said resetting pulses are derived, means for connecting the output electrode of said buffer valve to said resetting line, a rectifier connected between said resetting line and a point of earth potential with such polarity that said rectifier presents a high impedance to earth for the resetting pulses applied to said resetting line through said buffer valve, a plurality of resistors equal to the number of electronic valves, one end of each resistor being respectively connected to the control electrode of one of the electronic valves, means connecting the other ends of those resistors to which it is desired that resetting pulses should be applied to said resetting line, and means connecting the other ends of the remaining resistors to the point of earth potential.

10. An electronic counting circuit comprising a plurality of trigger-pair circuits each consisting of a pair of cross-connected electronic valves, a resetting line, a point of earth potential, a plurality of rotary selector switches equal in number to the number of electronic valves, each switch having a rotary contact and a plurality of fixed contacts, means connecting some of the fixed contacts of each switch to said resetting line, means connecting others of the fixed contacts of each switch to said point of earth potential, a plurality of resistors equal to the number of electronic valves, one end of each resistor being respectively connected to the control electrode of one of the electronic valves, and the other end of each resistor being respectively connected to the rotary contact of one of the selector switches, means for applying resetting pulses to said resetting line, and an electronic rectifier connected between said resetting line and said point of earth potential with such polarity that said rectifier presents a high impedance to earth for the resetting pulses applied to said resetting line.

11. An electronic counting circuit comprising a plurality of trigger-pair circuits each consisting of a pair of cross-connected electronic valves, a resetting line, a point of earth potential, a plurality of rotary selector switches equal in number to the number of electronic valves, each switch having a rotary contact and a plurality of fixed contacts, means connecting some of the fixed contacts of each switch to said resetting line, means connecting others of the fixed contacts of each switch to said point of earth potential a plurality of resistors equal to the number of electronic valves, one end of each resistor being respectively connected to the control electrode of one of the electronic valves, and the other end of each resistor being respectively connected to the rotary contact of one of the selector switches, means interengaging said rotary contacts for rotating all of said rotary contacts simultaneously, a condenser connected to said resetting line means for applying resetting pulses to said condenser and an electronic rectifier connected between said resetting line and said point of earth potential with such polarity that said rectifier presents a high impedance to earth for the resetting pulses applied to said resetting line.

12. An electronic counting circuit comprising a plurality of trigger-pair circuits each consisting of a pair of cross-connected electronic valves, each valve having an anode, a cathode and a grid electrode, a resetting line, a point of earth potential, a plurality of rotary selector switches equal in number to the number of electronic valves, each switch having a rotary contact and a plurality of fixed contacts, means connecting some of the fixed contacts of each switch to said resetting line, means connecting others of the fixed contacts of each switch to said point of earth potential a plurality of resistors equal to the number of electronic valves, one end of each resistor being respectively connected to the grid electrode of one of the electronic valves, and the other end of each resistor being respectively connected to the rotary contact of one of the selector switches, means interengaging said rotary contacts for rotating all of said rotary contacts simultaneously, a condenser connected to said resetting line means for applying resetting pulses to said condenser and an electronic rectifier connected between said resetting line and said point of earth potential with such polarity that said rectifier presents a high impedance to earth for the resetting pulses applied to said resetting line.

13. A circuit arrangement for resetting to a predetermined state a plurality of trigger circuits, wherein each trigger circuit consists of a number of electronic valves, comprising a resetting line, means for applying negative resetting pulses to said resetting line, a rectifier, a point of earth potential, means for connecting the rectifier between said resetting line and said point of earth potential such that said rectifier presents a high impedance to earth for the negative resetting pulses applied to said resetting line, a plurality of resistors, one end of each resistor being respectively connected to the control electrode of one of the electronic valves, means connecting the other ends of those resistors to which it is desired that the negative resetting pulses should be applied to said resetting line, and means connecting the other ends of the remaining resistors to the point of earth potential.

References Cited in the file of this patent

UNITED STATES PATENTS

| | | |
|---|---|---|
| 2,403,984 | Koenig et al. | July 16, 1946 |
| 2,540,442 | Grosdoff | Feb. 6, 1951 |
| 2,568,918 | Grosdoff | Sept. 25, 1951 |
| 2,591,007 | Rench | Apr. 1, 1952 |
| 2,595,646 | Doba et al. | May 6, 1952 |
| 2,604,263 | MacSorley | July 22, 1952 |